R. C. ENYART.
PRESSURE REGULATOR.
APPLICATION FILED MAY 2, 1917.

1,249,934.

Patented Dec. 11, 1917.

Witness:
Charles Vollbrecht

Ralph C. Enyart,
Inventor
by James W. See
Attorney

UNITED STATES PATENT OFFICE.

RALPH C. ENYART, OF CONNERSVILLE, INDIANA, ASSIGNOR TO THE P. H. & F. M. ROOTS COMPANY, OF CONNERSVILLE, INDIANA.

PRESSURE-REGULATOR.

1,249,934.  Specification of Letters Patent.  Patented Dec. 11, 1917.

Application filed May 2, 1917. Serial No. 165,883.

*To all whom it may concern:*

Be it known that I, RALPH C. ENYART, a citizen of the United States, residing at Connersville, Fayette county, Indiana, have invented certain new and useful Improvements in Pressure-Regulators, of which the following is a specification.

This invention pertains to improvements in that class of pressure-regulators in which a regulating agent is operated through the medium of a movable body exposed to and moving under the influence of variations in the pressure of the fluid being governed, the pressure being a plenum or a vacuum as the case may be.

My invention will be readily understood from the following description taken in connection with the accompanying drawing in which:—

Figure 1:
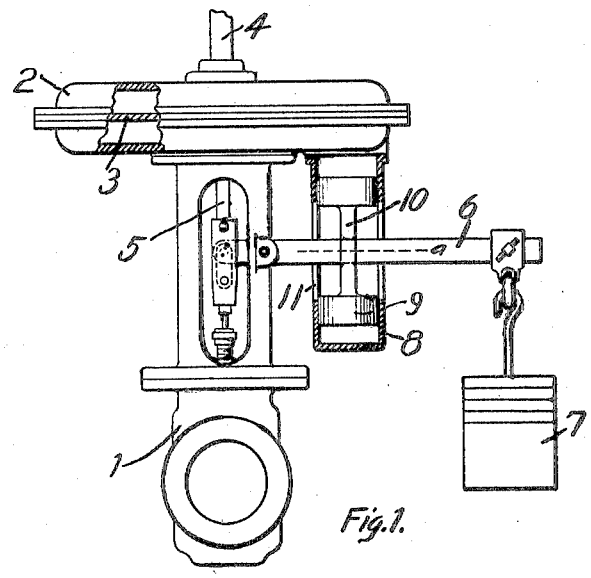
Figure 3:
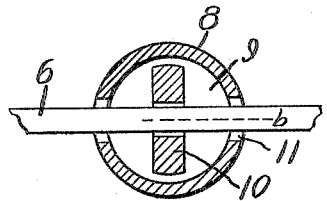
Figure 2:
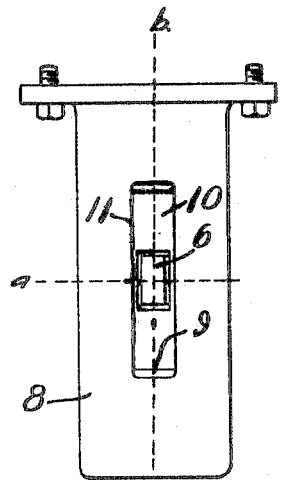

Figure 1 is a front elevation of a pressure-regulator of the diaphragm type fitted with my improvement, portions appearing in vertical section in the plane of line *b* of Figs. 2 and 3:

Fig. 2 a side elevation of the dashpot: and Fig. 3 a horizontal section of the dashpot in the plane of line *a* of Figs. 1 and 2.

A diversity of scales is employed in the drawing.

In the drawing:—

1, indicates the body of a valve, which is to be taken as typifying an agent through the medium of which the pressure of a fluid or liquid is to be regulated:

2, a diaphragm-casing connected with the valve-body:

3, a diaphragm disposed in the diaphragm-casing:

4, an inlet to the diaphragm-casing above the diaphragm, this inlet to serve in maintaining over the diaphragm a pressure of the fluid or liquid after it has passed the regulating valve:

5, the valve-stem serving as usual to connect the valve with the diaphragm:

6, a pivoted lever having its shorter arm connected with the valve-stem: and 7, an adjustable counterbalance-weight supported by the longer arm of the lever.

All of the parts thus far referred to are or may be of usual construction and subject to any usual modifications. The operation would be as usual, that is to say, the diaphragm and the counterbalance weight form two members of an equilibrium couple balanced when the pressure beyond the apparatus is normal. If the pressure acting upon the diaphragm should fall below the normal, then the counterbalance weight would preponderate and give to the valve an opening motion, and vice versa.

Under the influence of sudden changes in pressure the moving parts are apt to overtravel, owing to their kinetic energy, the overtravel of the parts bringing about a reversal of the direction of motion of the parts and their overtravel in the new direction, and so on through a series of oscillations while the parts are hunting for proper position, which may possibly not be found in time to anticipate new changes in the pressure-condition. I associate with the lever a peculiarly constructed dash-pot to check the velocity of the moving parts of the apparatus.

Proceeding with the drawing:—

8, indicates a dashpot cylinder secured to the apparatus with its axis in the vertical plane of the lever, the lever crossing the cylinder at about the mid-length of the cylinder:

9, a pair of connected pistons working in the cylinder, one above and the other below the lever:

10, a flat neck rigidly connecting the two pistons and transversely mortised for the passage of the lever, the lever engaging the floor and the roof of the mortise: and 11, mortises through the wall of the cylinder to permit the passage of the lever.

The two pistons constitute, in effect, a single double-ended piston. The cylinder is formed with a permanent closure at its lower end and the upper end becomes closed when the cylinder is attached to the apparatus, the attachment being illustrated as consisting of a flange at the open end of the cylinder bolted up against the diaphragm-casing. The cylinder needs to be accurately bored only at its ends where the pistons work, providing the intermediate portions of the cylinder are large enough to freely permit the passage of the lower piston. The pistons are not provided with packing and are not to fit air-tight in the cylinder. An ordinary fair sliding fit of the pistons in the cylinder will permit the leakage of air past the pistons if sufficient time is given. Normally, the pistons will have a certain position in the cylinder, and if the lever moves one way or the other, in response to changes in the pressure being regulated, such movement will be resisted by the air penned up in the cylinder and tending to be compressed by one of the pistons, and reduced in pressure by the other piston, the leakage of air past the pistons eventually permitting them to take new positions in the cylinder in correspondence with the movement of the lever. The parts are thus prevented from making sudden or overtraveling movements.

The dashpot is of extremely simple and economical construction and is adapted for ready attachment to various types of pressure-regulators provided with a lever, the regulator particularly set forth being merely an example.

I claim:—

1. A pressure regulator comprising, a fixed horizontally disposed diaphragm casing, a diaphragm therein, a vibratable horizontal lever disposed under the casing and connected with the diaphragm, a cylinder formed with a closure at one end and provided at its other end with means for securing it against the casing to close the opposite end of the cylinder, said lever passing freely through mortises in the wall of the cylinder, and a double-ended piston disposed in the cylinder and provided between its ends with a mortise engaging the lever, combined substantially as set forth.

2. A pressure regulator comprising in combination with a diaphragm and a valve operably connected thereto, of a cylinder having its wall transversely mortised for the passage of a lever, a double-ended piston disposed in the cylinder and provided between its ends with a transverse mortise to receive and engage the lever, a lever passing through said mortises and engaged by the floor and roof of the mortise in the piston, the free end of said lever extending beyond said cylinder and the other end being operably connected with said diaphragm, and means on the free end of said lever for adjusting the balance thereof, combined substantially as set forth.

RALPH C. ENYART.

Witnesses:
HATTIE Q. ENYART,
WILLIAM J. CAIN.

Copies of this patent may be obtained for five cents each, by addressing the "Commissioner of Patents. Washington, D. C."